United States Patent [19]

Hill

[11] Patent Number: 4,650,775

[45] Date of Patent: Mar. 17, 1987

[54] THERMALLY BONDED FIBROUS PRODUCT

[75] Inventor: Charles A. Hill, Lynchburg, Va.

[73] Assignee: The Babcock & Wilcox Company, New Orleans, La.

[21] Appl. No.: 857,699

[22] Filed: Apr. 29, 1986

[51] Int. Cl.⁴ ............................................. C04B 35/02
[52] U.S. Cl. ...................................... 501/95; 428/296; 162/152; 162/181.2; 162/181.6; 501/96
[58] Field of Search .................. 162/152, 181.2, 181.6; 501/36, 53, 73, 77, 95, 96; 428/288, 296

[56] References Cited

U.S. PATENT DOCUMENTS

| | | | |
|---|---|---|---|
| 4,269,887 | 5/1981 | Sonobe et al. | 162/181.2 |
| 4,331,773 | 5/1982 | Hongs et al. | 501/95 |
| 4,381,716 | 5/1983 | Hastings et al. | 501/95 |
| 4,384,046 | 5/1983 | Nakagami | 501/95 |

FOREIGN PATENT DOCUMENTS 0348532 8/1972 U.S.S.R. .

Primary Examiner—James J. Bell
Attorney, Agent, or Firm—Vytas R. Matas; Robert J. Edwards

[57] ABSTRACT

A thermally bonded fibrous product is composed of a sintered blend of aluminosilicate fibers, silica powder and boron nitride powder.

7 Claims, No Drawings

THERMALLY BONDED FIBROUS PRODUCT

BACKGROUND OF THE INVENTION

This invention relates to thermally bonded aluminosilica products and, more particularly, to thermally bonded aluminosilicate fibrous products of a novel and advantageous composition suited for use as diesel soot filters, kiln furniture, combustor liners, burner tubes and other high temperature applications.

Ceramic fibers are often used to provide thermal insulation from very high temperatures. For many applications, it is convenient and often necessary to form the fibers into rigid shapes such as boards or specialty configurations. Two approaches are used to accomplish bonding of ceramic fibers to obtain these shapes. Chemical bonding is the most common. A heat or air setting binder, usually in the liquid form, is added to the fiber and through drying, the application of low to moderate heat, or chemical reaction, the binder becomes rigid and literally glues the fibers into a rigid structure. Such binders include colloidal oxide suspensions, silicate solutions and thermoplastic suspensions. The strength of these systems are relatively low, typically having 20 to 50 psi flexural strength properties. More binder can be added to increase the strength. However, the additional binder adversely affects thermal insulating properties.

A second family of rigid ceramic shapes has been developed that utilizes more expensive firing schedules to sinter or fuse the fibers into a rigid structure. Flexural strengths are 10 to 20 times that of chemical bonding at the same density with no sacrifice in insulating properties. Difficulties in matching thermal expansion and preventing destructive crystal growth in the fibers have been experienced. Some success has been reportedly achieved through the use of a blend of silica fibers and aluminoborosilicate fibers. This technology still depends on the use of very expensive, high purity fibers and teaches against the use of lower grade fibers or lower grade particulates.

SUMMARY OF THE INVENTION

In accordance with the invention, a thermally bonded fibrous product is provided from compositions comprising a sintered blend of aluminosilicate fibers, silica powder, rather than silica fiber, and boron nitride powder.

The thermally bonded fibrous products of the invention advantageously provide inexpensive constructions of high thermal insulating value with improved strength at relatively low densities.

In the product of the invention, the components of the product, on a weight basis, consist essentially of 75% aluminosilicate fiber, 20% silica powder ($-325$ mesh) and 5% boron nitride powder ($-325$ mesh) sintered by firing at the temperature of at least 2350° F. (1288° C.). The use of silica powder as a bond former, rather than silica fibers, is unique in that conventional thermal bonding theory teaches the use of silica fiber as a bonding agent.

DETAILED DESCRIPTION

The invention comprises the construction or formation of thermally bonded fibrous products, comprising a sintered blend of primarily aluminosilicate fibers, silica powder and boron nitride powder, that are low in cost, and have high-strength, low-density and high thermal insulating value with improved machineability. Specifically, the products comprising the composition of this invention are particularly suited for use as diesel soot filters, kiln furniture, combustor liners and burner tubes.

Suitable fibers for the practice of this invention consist essentially of approximately equal parts of alumina and silica such as KAOWOOL brand ceramic fiber marketed by the Babcock & Wilcox Company. The aluminosilicate fibers have average diameters of about 3 microns.

The particulates employed in the formation of the products of the invention include $-325$ mesh silica powder and smaller amounts of $-325$ mesh boron nitride powder. Suitable silica powders include high purity quartz silica powder ($-325$ mesh), as is available from Atlantic Equipment Engineers, and high purity amorphous fumed silica (12 millimicron), marketed under the trademark AEROSIL 200 by Degussa. Boron nitride powder marketed as UCAR HCV by Union Carbide has been found to provide a suitable boron nitride.

The following examples are illustrative and explanatory of portions of the invention and not restrictive thereof.

A number of billets measuring 8.5 inches (25.4 cm) square and 1.5 inches (3.8 cm) thick were prepared from compositions of aluminosilicate fiber, silica powder and boron nitride powder was first added to deionized water.

Starting materials included a first system having, by weight, 76.2% of aluminosilicate fiber, 19% silica powder and 4.8% boron nitride powder, and a second system having, by weight, 89.5% aluminosilicate fiber, 7.2% amphorous fumed silica powder and 3.3% boron nitride powder. The solution was mixed in a high shear Arde Barinco CJ-4 lab mixer for a sufficient time to disperse the solids within the solution. The aluminosilicate fiber was then added and the modified solution was further mixed for a sufficient time to disperse the fiber component in the solution. After dispersion, a small amount of Betz 1260 polymer was added to flocculate the solution.

Billets were formed from the flocculated fiber/powder slurry in a casting/pressing tower. This tower had a top and bottom platen, each platen constructed such that a vacuum could be applied and liquid removed through the platen. After the slurry was added, it was allowed to free-drain. The resultant pad was then pressed by movement of the bottom platen to a desired thickness. During the processing operation, a vacuum was applied to the top and bottom platen.

The pad was oven dried, at approximately 250° F. (121° C.) until thoroughly dry. The dried parts were then fired in an electric furnace, at a heat-up rate of about 400° F./hr (205° C./hr and held at the sintering temperature for 90 minutes. The aluminosilicate fiber-silica powder-boron nitride composition was then fired at 2350° F. (1287° C.), the aluminosilicate-fumed silica-boron nitride was fired at 2500° F. (1371° C.).

Room temperature modulus of rupture and density were determined in the as-fired condition, and after reheats to 1800° F. (982° C.), 2100° F. (1148° C.) and 2400° F. (1316° C.). Table I reflects the values of these properties for sample billets formed from the first system composition while Table II reflects the values of these properties for sample billets formed of the second system composition.

The billets displayed no shrinkage at reheat temperatues of 1800° F. (982° C.) and 2100° F. (1149° C.). At a reheat temperature of 2400° F. (1316° C.), sample billets of the first system composition experienced less than 7% volumetric shrinkage and sample billets of the second system composition experienced less than 2% volumetric shrinkage.

Analysis has indicated that boron nitride is released upon firing, above the temperature of 1200° F. (649.5° C.) and fluxes the silica powder to form a fused bond at the fiber intersections, thereby producing an extremely strong shape. In addition, the boron nitride aids in the stabilization of the fused bond against crystallization. When blends in the desired portions, by weight, of approximately 75% aluminosilicate fiber, are formed, and fired, a very strong, lightweight insulation results.

TABLE I

| | −325 Mesh Silica Powder | | | |
|---|---|---|---|---|
| | | Reheat | | |
| | As Fired | After 8 hr @ 1800° F. (982° C.) | After 48 hr @ 2100° F. (1149° C.) | After 8 hr @ 2400° F. (1316° C.) |
| MOR, psi (kg/cm$^{-2}$) | 860 (60.4) | 805 (56.6) | 820 (57.6) | 1025 (72.0) |
| Density pcf (kg/m$^3$) | 31 (496.6) | 31 (496.6) | 29 (464.6) | 31 (496.6) |
| MOR/Density (Psi/Pcf) | 28 | 26 | 28 | 33 |
| Firing Temp. | | | | |
| °F. (°C.) | 2650 (1454) | 2650 (1454) | 2350 (1288) | 2350 (1288) |

TABLE II

| | Fumed Silica Powder | | |
|---|---|---|---|
| | | Reheat | |
| | As Fired | After 48 hr. @ 2100° F. (1149° C.) | After 8 hr. @ 2400° F. (1316° C.) |
| MOR, psi (kg/cm$^2$) | 380 (26.7) | 430 (30.2) | 460 (32.3) |
| Density pcf (kg/m$^3$) | 25 (464.6) | 27 (432.5) | 27 (432.5) |
| MOR/Density (Psi/Pcf) | 15 | 16 | 17 |
| Firing Temp. | | | |
| °F. (°C.) | 2500 (1371) | 2500 (1371) | 2500 (1371) |

The invention claimed is:

1. A thermally bonded fibrous product having high thermal insulating value, high modulus of rupture and low density comprising a blend of aluminosilicate fibers, silica powder and boron nitride powder formed by sintering at a temperature of at least 2350° F.

2. A thermally bonded fibrous product as set forth in claim 1 wherein said blend, by weight, consists essentially of 75% aluminosilicate fiber, 20% silica powder and 5% boron nitride powder.

3. A thermally bonded fibrous product as set forth in claim 2 wherein the silica powder consists essentially of −325 mesh silica powder and the boron nitride powder consists essentially of −325 mesh boron nitride powder.

4. A thermally bonded fibrous product as set forth in claim 3 wherein said blend, by weight, consists essentially of 76.2% aluminosilicate fiber, 19% silica powder and 4.8% boron nitride powder.

5. A thermally bonded fibrous product as set forth in claim 2 wherein the siica powder consists essentially of 12 millimicron amorphous fumed silica.

6. A thermally bonded fibrous product as set forth in claim 5 wherein said blend, by weight, consists essentially of 89.5% aluminosilicate fiber, 7.2% amorphous fumed silica, and 3.3.% boron nitride powder.

7. A thermally bonded fibrous product as set forth in claim 6 wherein the sintering temperature is 2500° F.

* * * * *